United States Patent [19]

von Ahrens

[11] Patent Number: 4,515,000
[45] Date of Patent: May 7, 1985

[54] METHOD FOR MANUFACTURING CONSUMABLE WELDING SPACER

[75] Inventor: Roger W. von Ahrens, Colonia, N.J.

[73] Assignee: Robvon Backing Ring Company, Avenel, N.J.

[21] Appl. No.: 419,633

[22] Filed: Sep. 17, 1982

[51] Int. Cl.$^3$ .......................... B21C 1/00; B21C 3/00
[52] U.S. Cl. ........................................ 72/278; 72/274
[58] Field of Search ............... 72/274, 276, 278, 279, 72/282

[56] References Cited

U.S. PATENT DOCUMENTS

| | | | |
|---|---|---|---|
| 1,929,695 | 10/1933 | Julien | 72/274 |
| 2,193,856 | 3/1940 | Blount et al. | 72/278 |
| 3,256,731 | 6/1966 | Peterson | 72/274 |
| 3,395,528 | 8/1968 | Lucht | 72/274 |
| 3,417,589 | 12/1968 | Bobrowsky | 72/274 |
| 3,782,154 | 1/1974 | Fuchs, Jr. | 72/274 |
| 3,955,390 | 5/1976 | Geary | 72/278 |

FOREIGN PATENT DOCUMENTS 2058151  6/1971  Fed. Rep. of Germany ........ 72/278

OTHER PUBLICATIONS

Adam, Alastair T., *Wire-Drawing and the Cold Working of Steel,* Witherby, H.F. & G., London, 1925, pp. 55, 56.
Van Vlack, Lawrence H., *Elements of Materials Science,* Addison-Wesley Publishing Co., Reading, Mass., 1967, p. 411, Appendix C.

*Primary Examiner*—Daniel C. Crane
*Attorney, Agent, or Firm*—David A. Jackson; Daniel H. Bobis

[57] ABSTRACT

A method is disclosed for preparing consumable insert rings for use in welding of conduit and the like, which utilizes a drawing operation. Particularly, a ring having a multiple gauge configuration is drawn by a process whereby the first drawing pass achieves 80 to 90% preparation of the final cross-sectional configuration. The drawing operation may be conducted at speeds of about 1' per minute, and final dimensions and shape of the inserts may be achieved by as few as two drawing passes. Surface uniformity is achieved and work hardening of the insert during formation is minimal. Starting stock utilized in the present method may be of lesser diameter than that used in conventional processes.

5 Claims, 4 Drawing Figures

METHOD FOR MANUFACTURING CONSUMABLE WELDING SPACER

BACKGROUND OF THE INVENTION

1. Field of the Invention:

The present invention relates generally to materials used in welding, and particularly to the preparation of welding inserts, or spacers that are utilized between surfaces to be joined by the welding method.

2. Description of the Prior Art:

In general, consumable inserts are well known and have for many years been utilized in complex welding situations, such as in the welding of pipes or tubular bore products, where because of their dimension, access to the weld point is limited. The specifications for consumable inserts are well known and have been stated in numerous industry publications, among them the American Welding Society specification AWS A5.30-79, entitled "Specification for Consumable Inserts", published by the American Welding Society, Incorporated, Miami, Florida, the entirety of which is incorporated herein by reference. As stated therein, consumable inserts are utilized where welding is conducted from one side of the junction of two metal surfaces, either for the maintenance of consistent high quality welds, where welding conditions are less then optimum, or in the instance where it is necessary to minimize obstructions within the inside of the tubular bored joint.

As a review of the above mentioned publication will reveal, most consumable inserts are ring-like in shape, and are thus generally intended for use in the formation of pipe or tubular bored joints. Various well known cross-sectional configurations are utilized, and are recited in the American Welding Society (AWS) publication, that may be chosen in accordance with the specific contour of the surfaces to be joined. For example, a common cross-sectional configuration is identified as the "T" shape, and such shape is illustrated infra. herein in FIG. 1. Likewise, another common shape comprises the "J" shape illustrated herein as well. Each shape is suited for specific application, and all shapes must be prepared to exacting tolerances on the order of up to about 0.005" or less.

The criticality of the dimensional requirements for consumable inserts is made all the more important, when it is considered the materials out of which these inserts are manufactured are all relatively hard metals, such as chromium molybdenum steels, austenitic chromium nickel steels, nickel alloys, including copper-nickel alloys and mild steel. Generally, consumable inserts have been prepared by machining to the desired tolerance, as the materials out of which these inserts are manufactured are of a hardness that has discouraged cold-working techniques. Also, the raw wire for conversion to the consumable insert must meet certain hardness standards, known as Rockwell B hardness, and in particular, must conform to a rating of from 60 to 80.

Thus, the extreme hardness and low workability of the materials required for the manufacture of consumable inserts, together with the exacting tolerance to which such inserts must be manufactured, and the tensile strength and Rockwell hardness values that the resulting products must possess to meet known standards, have all militated against the employment of any metal forming techniques, whether conducted at room temperature or at elevated temperatures. A particular drawback and concern, results from the known tendency of metal undergoing forming to work harden. As consumable inserts should reside within specific ranges of hardness, i.e. between approximately 72 to 100,000 psi tensile strength, earlier attempts to prepare such spacers by forming techniques were discouraged when it was found that the tensile strength of the final product resided outside the accepted range for the particular product, affording an unsuitable bend range for forming the insert ring; thus rendering the material unworkable.

As noted earlier, therefore, the technique of machining has been generally utilized in the industry to prepare consumable inserts. While this technique results in the preparetion of generally acceptable products, it, too possesses many drawbacks. Such drawbacks include the inefficiency in metal removal and retrieval, associated with the presence of burrs on the edges of the rings, and unevenness in the surfaces that directly abut the surfaces of the articles to be joined. The unevenness in the formed surfaces, known as "lands" leads to gaps between the joined surfaces that promotes the development of the undesired cracks and other imperfections in the welded joint, which imperfections affect the fusibility and soundness of the weld, and generally cause the weld to fail.

A need therefore exists to develop a technique for the manufacture of consumable inserts, that is more efficient and results in the preparation of a reliable product having the desired tensile strength and dimensional stability necessary for this product.

SUMMARY OF THE INVENTION

In accordance with the present invention a method for forming the wire shape for use as a consumable welding insert is disclosed. The method comprises drawing a continuous wire of circular cross-section through appropriately configured drawing dies, to reshape the wire to a multiple gauge cross-sectional configuration for ultimate use in forming a circular ring. Preferably, the drawing is conducted in two passes, the first of which effects at least an 80 to 90% revision in cross-sectional shape of the wire, to form the desired shape of the insert wire. The present method is characterized by radial flow of the metal, that causes the formation of a 15 to 20% extension in the resulting cross-sectional configuration of the insert wire.

The radial flow experienced during the drawing operation of the present invention facilitates the use of starting stock of lesser diameter than that of the greatest cross-sectional dimension of the final insert product. Thus, scrap is reduced substantially over the conventional machining or milling processes utilized in the prior art, and reduced size of starting stock is, as previously noted, also possible.

A further feature of the present invention, is that dimensional stability is achieved with a minimum of metal forming, so that the cost of the product is substantially reduced. Likewise, the defects noted with respect to the prior art products; namely, edge burrs, uneven lands, and non-perpendicular ribs are eliminated.

The present method may be practiced at a variety of drawing speeds, with the drawing speed of approximately one foot per minute being preferred. In general, the method may be practiced in two passes, wherein the first pass achieves as noted earlier, an 80% to 90% revision in cross-section toward the formation of the ultimate cross-sectional shape.

Products prepared by the present method undergo a minimum of work hardening due to the relatively brief processing, and are therefore capable of preparation from starting stock having the hardness levels desired in the final product. The present method unexpectedly does not impose substantial work hardening on the products, and therefore one may accurately determine and control the exact hardness of the final insert product.

The inserts of the present invention possess smooth and accurate surfaces, and do not exhibit any surface defects such as scalloping, associated with machining processes in the prior art. Moreover, the radial flow experienced during the practice of the present method is predictable in that it comprises approximately a 15 to 20% increase in relation to the diameter of the starting stock, that does not occur with corresponding surface distortion. The resulting inserts meet or exceed all of the specifications set down by the American Welding Society.

Accordingly, it is a principal object of the present invention to provide a method for preparing a consumable insert, that results in the preparation of products having improved dimensional accuracy and surface uniformity.

It is further object of the present invention to provide a method as aforesaid, capable of forming products from reduced quantities of starting stock.

It is a further object of the present invention to provide a method as aforesaid that reduces work hardening of the metal stock during product formation.

It is a still further object of the present invention to provide a method as aforesaid which minimizes raw product scrap generation during its operation.

Other objects and advantages will become apparent to those skilled in the art from a consideration of the ensuing description which proceeds with reference to the following illustrative drawings.

DETAILED DESCRIPTION

Figure 1:
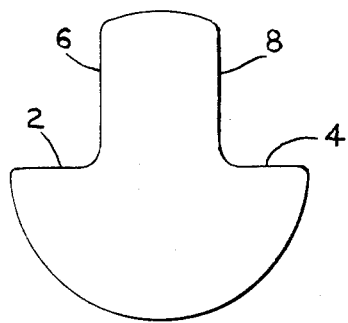
FIG. 1 is a schematic cross-sectional view illustrating a standard "inverted T section" for a consumable insert.

As noted earlier herein, the products known as consumable inserts are defined both in composition and utility by, among others, the standards or specifications for consumable inserts set forth by the American Welding Society, identified as publication AWS A5.30-79, and such publication is incorporated herein by reference. Two of the representative consumable inserts are illustrated in cross-section in FIGS. 1 and 2 herein. Referring to FIG. 1, a representative "inverted T" section is shown which is generally utilized in the instance where the edges of adjacent tubular bored products are to be joined by welding. The insert ring is positioned between the edges of the tubular products which themselves may be flared or beveled outward, or internally machined; and generally define a predetermined angle between them. Thus, the welding torch is applied to the outer circumference of the insert, causing integral fusion of the insert and the respective butting ends of the tubular products.

Figure 2:
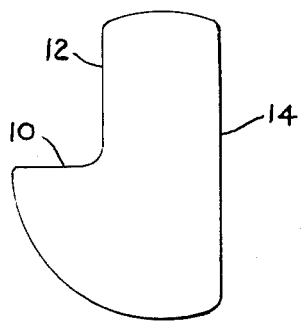
FIG. 2 is a schematic cross-sectional drawing illustrating a "J section" for a consumable insert.

The "J" section consumable insert illustrated in FIG. 2, is generally utilized when a tubular bore product is to be welded to a further tubular product or member of dissimilar end configuration. In such instance, the elongated flat surface of the "J" is positioned against the dissimilar and larger thickness member, while the essentially L-shaped indentation of the opposite surface of "J" receives the edge of the adjoining, thinner tubular bore.

The composition of consumable inserts may vary, and includes a variety of well known metals all chosen for compatibility to base material in welding operations. Thus, most of the metals contain iron in its various forms, as a major component thereof. Iron inhibits radial flow. In the instance of mild steel, a typical composition is: 0.90 to 1.85% manganese, 0.07 to 0.15% carbon, 0.025% phosphorus, 0.035% sulphur, 0.40 to 1.15% silicon, 0.05 to 0.15% aluminum, 0.02 to 0.12% ziconium, 0.05 to 0.15% titanium, balance essentially iron. Correspondingly, chromium molybedenum steels contain the foregoing ingredients, in addition to which chromium may be present in amounts of from up to 6.0% and molybdenum may be present in amounts of up to 1.2%, while enhanced quantities of silicon and a slightly depressed range of manganese is also evident. Finally, austenitic chromium nickel steels are characterized by from 18% to 32% chromium, 9% to 23% nickel, increased amount of manganese of up to about 2.5% and, when included, from about 2% to about 3% molybdenum.

All of the foregoing alloys have certain characteristics in common; namely, they are hard materials, difficult to form, by either hot or cold processing. In the instance where cold processing is utilized, one frequently finds that intensive work hardening of the alloy takes place. Work hardening occurs as a result of the formation of crystallites during the imposition of tension on the alloy, with the result that the alloy becomes rapidly embrittled. This condition is undesirable in the instance where the alloys are to be formed as consumable inserts, as the inserts must exhibit responsiveness and flow properties within carefully defined temperature limits in order that accurate and rapid welding can take place. In the instance where excessive work hardening as measured by Rockwell B hardness has developed, the alloy may fail to offer suitable flow at the welding temperature, with the result that the weld will be imperfect and will probably fail.

As noted earlier, further criticalities exist in the manufacture of consumable inserts, relating to their dimensional stability. That is, while the insert may have the desired hardness and exhibit the desired flow properties, surface defects such as edge burrs and uneven "lands" (those surfaces labeled 2, 4, 6, 8, 10, 12 and 14, respectively in FIGS. 1 and 2), would define gaps with the adjacent butting surfaces of the articles to be welded, with the result that weld imperfections, cracks and the like may nonetheless develop.

The present invention is believed to remedy the aforementioned problems, achieving the formation of the consumable insert wire by a straightforward drawing operation. The drawing of alloys is well known and extends back in time to the art of silversmithing. In most instances, the drawing art has been reserved for precious metals and other alloys offering relatively high ductility and formability. Thus, for example, ductile alloys such as aluminum are well known for their formability and capability of favorably undergoing drawing formations, while alloys of greater hardness and tensile strength, such as the steels defined above, and certain copper based alloys resist draw-forming operations.

Most draw forming operations are "cold-working" techniques. That is, they are performed at room temperature, on unheated materials. The extreme stresses imposed at the drawing die, particularly evidenced in the instance where materials of greater hardness are concerned, has generally militated against the adoption of drawing as a forming operation for these harder alloys. Specifically, in the instance where alloys (such as the steels mentioned herein and certain copper based alloys) are concerned, attempts to conduct drawing operations have met with continued failure. The surface of the drawn material frequently develops craters or eruptions known as "scallops", due to the stresses imposed by the die and the relatively brittle nature of the metal stock. A variety of lubricants have been utilized in an attempt to mitigate this phenomenon, however this has failed to produce commercially acceptable results.

The present products are particularly unlikely candidates for a forming operation of this type, in view of their multiple gauge configuration. A review of FIGS. 1 and 2 herein should bear out the difficulties that could be encountered in any attempt to draw cross-sectional shapes shown herein. Nonetheless, the present invention is predicated upon the discovery that the metal starting stock may be reshaped to form the multiple gauge cross-sectional configurations of the present consumable inserts, by a drawing operation utilizing preferably two drawing passes. While applicant is aware of the fact that earlier attempts to draw hard alloys in multiple gauge shape have succeeded, it is also applicant's understanding that drawing die configuration was extremely critical, so that die angle varied between respective thicknesses of the desired multiple gauge product, to discourage distortion and surface damage. The present invention, however, can be practiced with a drawing die having no criticality in its particular die surfacing or angulation, apart from the definition of the specific cross-sectional configuration desired in the end product.

In accordance with the present invention round starting stock is drawn to one of several shapes (two of which are represented in FIGS. 1 and 2) by a process that comprises conducting at least one and preferably two drawing passes of the stock through an appropriate drawing die at an average speed of up to about 1' per minute. The first pass known as the "roughing" pass confers an 80% to 90% cross-sectional reduction in the starting stock toward the ultimate cross-sectional configuration. Referring now to FIG. 1, an "inverted T section" is shown which comprises laterally opposed lands 2 and 4, and essentially perpendicularly disposed, adjacent butting surfaces 6 and 8. As described earlier, this configuration is utilized in the instance where two pipes of equal wall thickness are joined in end-to-end relationship. It can be seen that the regularity and tolerances of the lands 2 and 4 and ends 6 and 8 are critical; air gaps and other discontinuities are to be strictly avoided. Moreover, lands 2 and 4 must be in perfect alignment, to assure corresponding alignment and proper weld formation between the respective pipes or tubular bores.

Referring now to FIG. 2, the "J section" is shown, which comprises essentially one-half of the configuration shown in FIG. 1. That is, land 10 and butt end 12 are provided to receive a pipe of a given wall thickness, while an adjacent member of greater thickness abuts with broad surface 14. As with the insert having the cross-sectional configuration shown in FIG. 1, the "J section" must be prepared to exacting tolerances, to offer a continuous and complete receiving surfaces for the respective members to be welded.

It is particularly surprising in the foregoing context that a drawing operation of the type utilized herein is successful. More particularly, starting stock of the prior art consumable inserts had to correspond in diameter with the greatest dimension of the ultimate product, inasmuch as a machining operation was utilized to prepare consumable inserts. By contrast, the present drawing operation may be conducted with starting stock of reduced diameters, because it has been found in accordance herewith that radial extension of the starting stock takes place during the drawing operation, in an amount that may range up to about 15 to 20% beyond the maximum diameter of the stock. Thus, the following table illustrates that raw stock of particular diameters may be formed into the standard dimensions and shapes in accordance with the present invention.

TABLE

| RAW STOCK (DIAMETER IN INCHES) | CONVERTED SHAPE (MAJOR DIMENSIONS IN INCHES) |
|---|---|
| .110" | ⅛" J section |
| .143" | 5/32" J section |
| .115" | ⅛" T section |
| .148" | 5/32" T section |

It should be apparent that the resulting converted shapes have certain longitudinal dimensions that are greater than the maximum cross-sectional dimensions of the starting stock, so that certain radial flow or extension has taken place. This carries an apparent advantage, in that prior art machining processes resulted in the generation of substantial scrap and correspondingly greater cost. By contrast, one may utilize the present method and may purchase stock of reduced diameter and corresponding reduced cost, while at the same time realizing a reduction in scrap generation due to the efficient redistribution of metal during the forming process.

Figure 3:
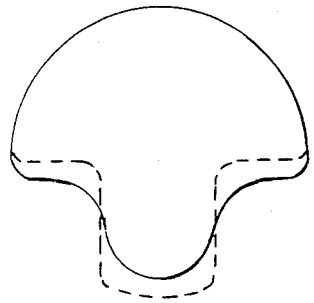
FIG. 3 is a schematic cross-sectional view of starting wire stock showing its approximate cross-sectional configuration after a first drawing pass.

As noted earlier, the drawing process of the present invention utilizes a first "roughing pass" wherein from 80 to 90% of the ultimate cross-section is formed. A review of FIG. 3 illustrates approximately the cross-sectional configuration of round starting stock that has been subjected to a first "roughing pass" through a die designed to prepare a product having the cross-sectional configuration shown in FIG. 1. Phantom lines have been provided herein, to illustrate schematically the extent of metal flow that is taking place. A better appreciation of the nature of the drawing process may be possible from a review of FIG. 4, which illustrates schematically the die elements utilized to form the cross-section in FIGS. 1 and 3. Thus, in FIG. 4, a major die element 20 shows an essentially semi-circular surface 22 which forms the "cap" of the "T". Approximately rectangular secondary elements 24 and 26 impose against the rounded surface of the starting stock, and commence the formation of lands 2 and 4, as shown in FIG. 3. The modular nature of the die components illustrated in FIG. 4 facilitates fine tuning of the die set to assure essential dimensional accuracy, such as parallelism of ends 6 and 8 and linear correspondence between lands 2 and 4.

Figure 4:
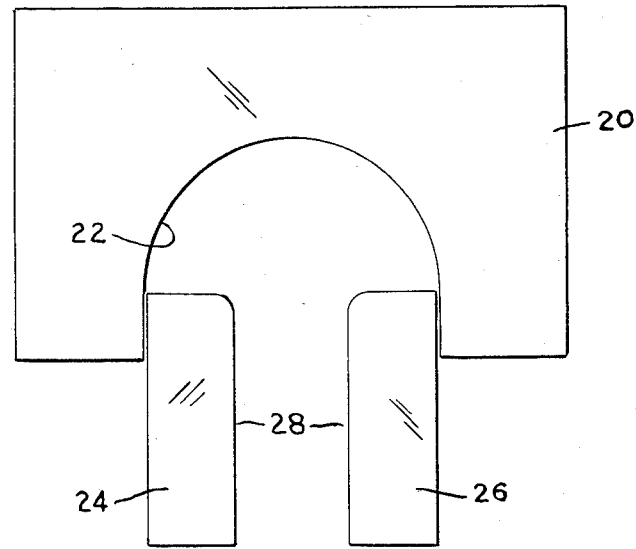
FIG. 4 is a schematic front view illustrating the elements of a drawing die suitable for the formation of the "inverted T section" consumable insert.

The components of the die set illustrated in FIG. 4 may be prepared from a variety of well known materials having sufficient hardness and dimensional stability in use. Naturally, while the drawing operation is essentially a "cold working" operation, sufficient heat due to friction develops during the drawing operation, that the materials out of which the die set are prepared must be resistant to deformation. A variety of such materials are known in the metal working art and may be utilized in the manufacture of the present die set.

Referring further to FIGS. 3 and 4, the present method has as one of its features, the development of radial metal flow during the drawing operation. The construction of the die illustrated in FIG. 4 permits elongation of the "stem" of the T-shape into the area 28, defined between elements 24 and 26. Conventionally, radial flow of this type in drawing operations takes place with adverse effects upon the product; that is, there is usually distortion in the development of this type of metal flow, so that the resulting product may exhibit non-uniformity in surface or dimension. It is one of the features of the present invention, however, that uniform cross-sectional dimension and surface are maintained, despite the development of radial flow, so that the resulting products require, at most, one or two additional drawing passes to achieve the final desired cross-sectional dimension and configuration.

The present method may be practiced by drawing the wire stock through the dies at speeds that are preferably about 1' per minute. When the present method is practiced at this speed, the insert surfaces remain smooth and dimensionally accurate, and the desired radial metal flow is achieved. Also, inserts prepared by the present method usually do not exhibit undesirable work hardening, and the starting materials may be selected with hardness ratings more closely approximate to the ranges of hardness desired in the end product than has been possible in the past. As the consumable inserts of the present invention should desirably have Rockwell B hardness ratings ranging from 60 to 80, the minimization of work hardening by the practice of the present method, makes it possible to prepare acceptable products with wire starting stock having higher hardness ratings than are usable with prior art processing.

In the instance where the final products possess excessive hardness, hardness may be reduced by conventional techniques, as by annealing within known parameters for the respective materials. Generally, annealing is conducted by a heating of the product within a specific time and a temperature and atmosphere designed to reduce stresses in the metal and to correspondingly reduce product hardness. The exact details of annealing may vary, and do not per se form a part of the present invention.

The products prepared in accordance with the present method are particularly distinctive in their capability to adhere to dimensional tolerance and specifications, when it is considered that the drawing process takes essentially linear starting stock and forms an essentially multiple gauge configuration while the stock is coiled to form a ring. The formation of the ring, alone, by a drawing procedure would be expected to result in surface defect due to the unequal nature of metal removal and flow, compounded by the multiple gauge nature of the drawing die. The fact that the multiple gauge products of the present invention are prepared in no more than one or two drawing passes, and possess smooth dimensionally stable surfaces, constitutes one of the distinctions hereof.

The present method is practiced by conducting a first roughing pass as described above, which effects an 80 to 90% formation of the ultimate cross-section of the insert. A further pass or passes is thereafter conducted, to complete the formation of the final insert product and to assure uniformity and adherence to dimension of the insert surfaces. This subsequent drawing pass is generally conducted through a drawing die of differing dimension to that of the die used for the roughing pass. Accordingly, the present method may be practiced by conducting the first and subsequent drawing passes in tandem, whereby continuous metal stock passes first through the roughing die, and thereafter through the refining dies, not shown herein, that define the final dimensions and shape of the insert product. Alternately, a coil of wire may be initially passed through the first roughing die, and re-wound into a coil. The second or subsequent refining die may be at a separate location and the material in its "rough drawn" condition may be run through the second refining die to complete the process. The exact technique by which this multiple drawing procedure may be performed, may vary within the skill of the art, although the first discussed embodiment is believed to comprise the best mode of practicing the present method.

It is understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within the spirit and scope and defined by the claims.

What is claimed is:

1. A method for forming a consumable welding insert having a multiple gauge configuration from a continuous length of wire having a Rockwell B hardness rating of from 60 to 80, consisting essentially of the steps of:
achieving an 80% to 90% formation of the final cross-sectional configuration of the insert consisting of the step of cold working said continuous length of metal wire by conducting a single first drawing pass of said wire through a drawing die defining a multiple gauge configuration, and
forming said consumable welding insert having its greatest cross-sectional dimension increased over the greatest cross-sectional dimension of said wire including the step of cold working said 80% to 90% formation by conducting at least one further drawing pass of said wire through a drawing die defining a multiple gauge configuration.

2. The method of claim 1 wherein said wire is drawn at a speed of about 1' per minute.

3. The method of claim 1 wherein said wire undergoes radial flow resulting in an increase in its greatest cross-sectional dimension, of from 15 to 20%.

4. The method of claim 1 wherein said wire is drawn through more than one drawing die.

5. The method of claim 4 wherein said wire is drawn simultaneously and sequentially through two different drawing dies.

* * * * *